United States Patent
Blanchard et al.

(10) Patent No.: US 10,168,867 B2
(45) Date of Patent: Jan. 1, 2019

(54) SYSTEM AND METHOD FOR GENERATING A UNIFIED MENU FOR MULTIPLE COMMUNICATION CHANNELS

(71) Applicant: AT&T INTELLECTUAL PROPERTY I, L.P., Atlanta, GA (US)

(72) Inventors: Harry E. Blanchard, Rumson, NJ (US); Lan Zhang, Malvern, PA (US); Gregory Pulz, Cranbury, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 513 days.

(21) Appl. No.: 14/839,297

(22) Filed: Aug. 28, 2015

(65) Prior Publication Data

US 2017/0060353 A1    Mar. 2, 2017

(51) Int. Cl.
*G06F 15/16* (2006.01)
*G06F 3/0482* (2013.01)
*H04L 12/24* (2006.01)
*G06F 9/451* (2018.01)

(52) U.S. Cl.
CPC ............ *G06F 3/0482* (2013.01); *G06F 9/451* (2018.02); *H04L 41/5061* (2013.01)

(58) Field of Classification Search
None
See application file for complete search history.

(56) References Cited

U.S. PATENT DOCUMENTS

| | | | |
|---|---|---|---|
| 6,456,619 B1 * | 9/2002 | Sassin | H04M 3/493 370/356 |
| 6,690,788 B1 | 2/2004 | Bauer et al. | |
| 6,850,949 B2 | 2/2005 | Warner et al. | |
| 7,515,695 B1 * | 4/2009 | Chan | H04M 3/493 379/221.09 |
| 7,746,362 B2 | 6/2010 | Busey et al. | |
| 8,428,246 B2 | 4/2013 | Venugopal et al. | |
| 8,661,112 B2 * | 2/2014 | Creamer | H04M 3/42059 379/88.16 |
| 8,731,918 B2 | 5/2014 | Wasserblat et al. | |
| 8,903,073 B2 | 12/2014 | Or-Bach et al. | |
| 9,008,283 B2 | 4/2015 | Riahi et al. | |
| 9,008,286 B2 | 4/2015 | Ni et al. | |
| 2002/0049736 A1 * | 4/2002 | Chow | G06Q 30/06 |
| 2002/0120932 A1 * | 8/2002 | Schwalb | H04L 12/2805 725/37 |
| 2004/0044585 A1 | 3/2004 | Franco | |

(Continued)

*Primary Examiner* — Taghi T Arani
*Assistant Examiner* — F J Farhadian
(74) *Attorney, Agent, or Firm* — Greenblum & Bernstein, P.L.C.

(57) ABSTRACT

Devices, systems, and methods for generating a unified menu for multiple communication channels are provided. User interaction information received via the multiple communication channels are transmitted to a central server over a network. The central server also receives notification information or directive information from a source external to the central server. The central server weighs the received information and transforms the weighted information into unified menu options in a unified menu. The unified menu is transmitted to the multiple communication channels, such that same unified menu options are provided at each of the multiple communication channels.

15 Claims, 9 Drawing Sheets

(56) References Cited

U.S. PATENT DOCUMENTS

| | | | | |
|---|---|---|---|---|
| 2004/0122941 | A1* | 6/2004 | Creamer | H04M 3/42059 709/224 |
| 2005/0216797 | A1* | 9/2005 | Dietz | G06Q 10/10 714/699 |
| 2006/0126818 | A1* | 6/2006 | Berger | H04M 3/5191 379/265.09 |
| 2006/0149571 | A1 | 7/2006 | Birch et al. | |
| 2006/0161864 | A1* | 7/2006 | Windl | G06F 3/0482 715/810 |
| 2006/0206659 | A1* | 9/2006 | Anne | H01L 21/76885 711/100 |
| 2006/0242557 | A1* | 10/2006 | Nortis, III | G06F 3/0482 715/234 |
| 2006/0268935 | A1* | 11/2006 | Feinberg | H04L 29/06 370/473 |
| 2006/0282398 | A1* | 12/2006 | Mueller | G06Q 20/20 705/400 |
| 2007/0266136 | A1* | 11/2007 | Esfahany | H04L 41/022 709/223 |
| 2008/0052639 | A1* | 2/2008 | Chun | G06F 3/0482 715/810 |
| 2008/0133529 | A1* | 6/2008 | Berkowitz | G06F 17/30017 |
| 2008/0141167 | A1* | 6/2008 | Kubo | G06F 3/0482 715/796 |
| 2010/0257409 | A1* | 10/2010 | Aranwela | G06F 17/3089 714/38.14 |
| 2012/0066647 | A1* | 3/2012 | Ullmann | G06F 3/0482 715/841 |
| 2012/0233002 | A1* | 9/2012 | Abujbara | G06Q 10/06 705/15 |
| 2013/0022191 | A1* | 1/2013 | Or-Bach | G06Q 30/0269 379/218.01 |
| 2013/0191810 | A1* | 7/2013 | Brandstetter | G06F 8/34 717/109 |
| 2013/0311918 | A1* | 11/2013 | McCoy | G06F 8/38 715/765 |
| 2014/0156783 | A1* | 6/2014 | Matthews | H04L 67/34 709/217 |
| 2014/0279085 | A1* | 9/2014 | Ahmad | G06Q 30/0641 705/15 |
| 2015/0106299 | A1* | 4/2015 | Rennie | G06Q 10/00 705/345 |
| 2015/0363049 | A1* | 12/2015 | Sadouski | G06F 3/0482 345/173 |
| 2016/0117762 | A1* | 4/2016 | Ahmad | G06Q 30/0641 705/15 |

\* cited by examiner

Computer

SYSTEM AND METHOD FOR GENERATING A UNIFIED MENU FOR MULTIPLE COMMUNICATION CHANNELS

BACKGROUND

1. Field of the Disclosure

The present disclosure relates to the field of communication menus. More particularly, the present disclosure relates to dynamic generation of a unified menu for distribution across multiple communication channels.

2. Background Information

Consumers may communicate with organizations or corporations through a variety of communication channels or media, e.g., automated call systems, live agents, smartphone applications, web pages, or instant messaging. Consumers may use different communication channels even when pursuing a single problem or interest. However, these communication channels may be independently managed and operate independent of one another.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
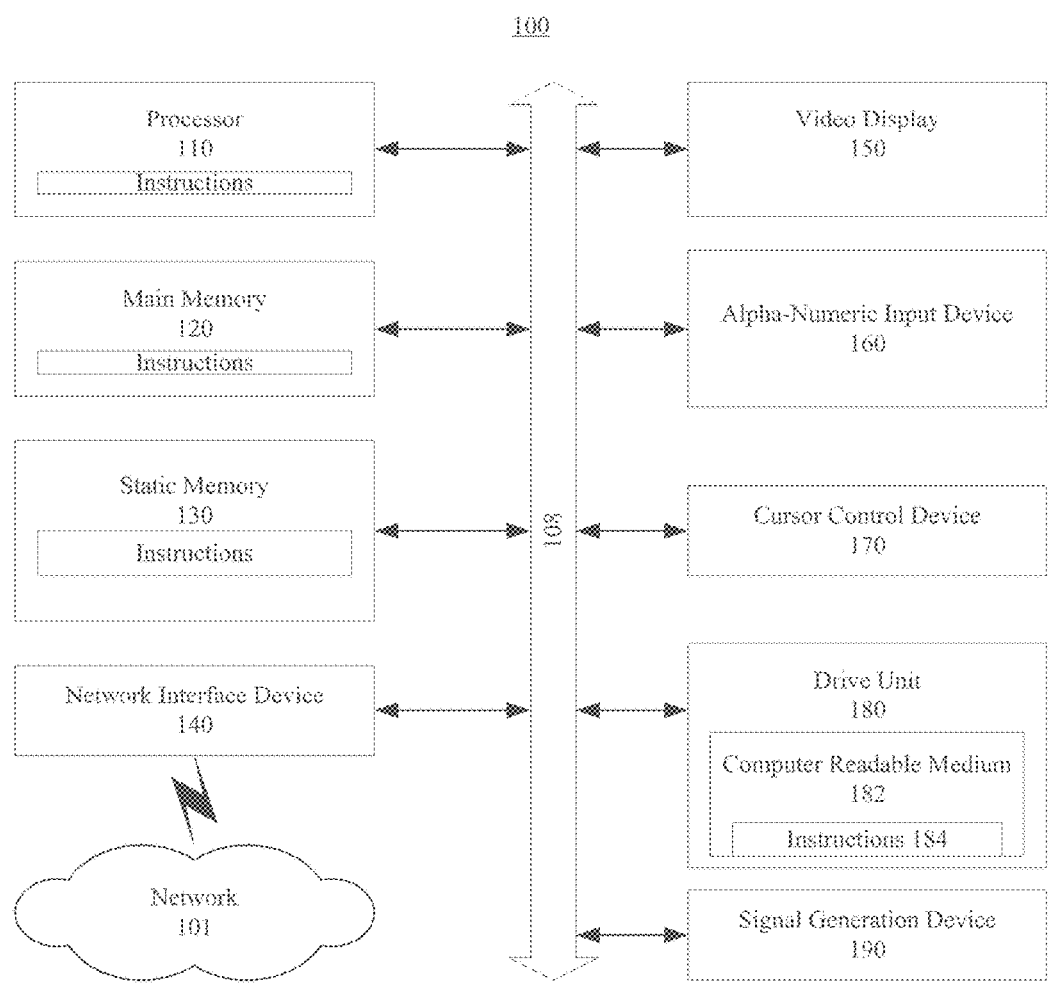
FIG. 1 shows an exemplary general computer system that includes a set of instructions for generating a unified menu.

FIG. 1 is an illustrative embodiment of a general computer system, on which a method of generating a unified menu for multiple communication channels can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both.

Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
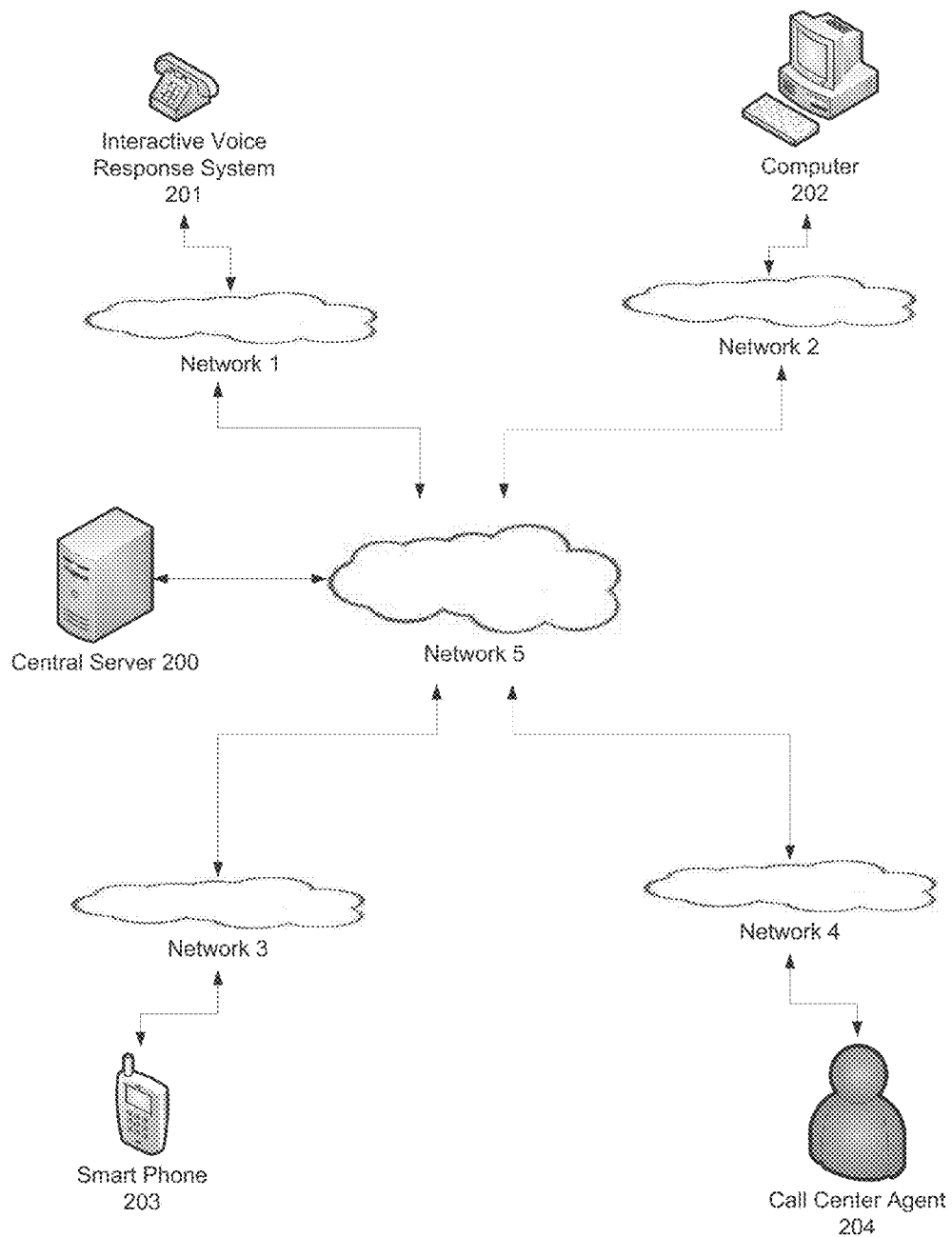
FIG. 2 shows an exemplary system to facilitate generation and issuance of a unified menu for multiple communication channels, according to an aspect of the present disclosure.

FIG. 2 shows an exemplary system to facilitate generation and issuance of a unified menu for multiple communication channels, according to an aspect of the present disclosure. Referring to FIG. 2, a central server 200 may receive or collect information through multiple communication channels. Multiple communication channels may support communication to and from, without limitation, an interactive voice response (IVR) system 201, a computer 202, a smart phone 203, and a call center agent 204. However, aspects of the disclosure are not limited the described devices, such that the central server 200 may also receive or collect information from any computing device having at least a processor and/or a transmitter/receiver, such as a smart refrigerator or the like.

The multiple communication channels may transmit or receive information to or from the central server 200 through or via a plurality of networks. The interactive voice response system 201 may communicate through a network 1, the computer 202 may communicate through a network 2, the smart phone may communicate through a network 3, and the call center agent may communicate through a network 4. Further, the central server 200 may communicate with one or more of the communication channels through a network 5.

Network 1, network 2, network 3, network 4, and/or network 5 may include a mobile network, wireless network, wired network, a telecommunications network, or any (other) data network that allows computing devices to exchange data. Although the central server 200 is illustrated as communicating with other communication networks through the network 5, aspects of the present disclosure are not limited to the described network, such that the central server 200 may communicate with one or more of the multiple communication networks through a different network.

Further, the information received through the multiple communication channels may go through a conversion process to convert the received information to a singular format for use by the central server 200. Similarly, when information is transmitted from the central server 200 to the multiple communication channels, the transmitted information may also go through a conversion process for communication through the respective communication channel.

Figure 3:
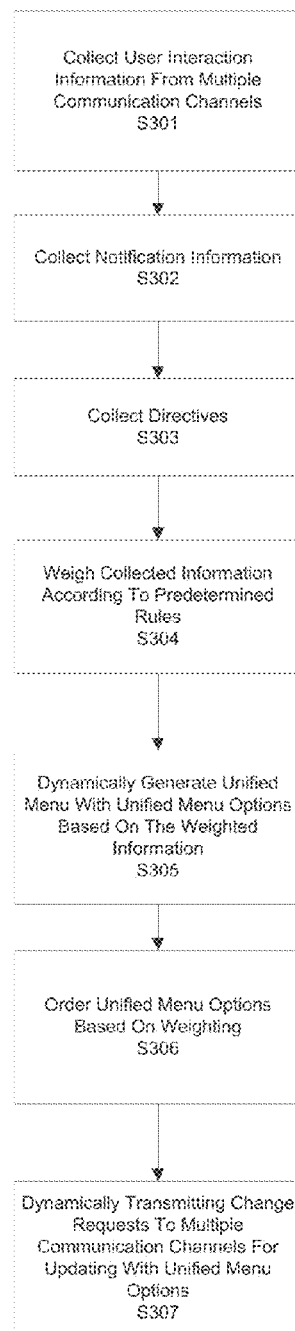
FIG. 3 shows an exemplary method for generating and issuing a unified menu across multiple communication channels, according to an aspect of the present disclosure.

FIG. 3 shows an exemplary method for generating and issuing a unified menu across multiple communication channels, according to an aspect of the present disclosure. At S301, a central server may collect user interaction information through multiple communication channels. The central server may collect the user interaction information according to a set frequency. For example, the central server may collect such information in real-time or at a set schedule. The central server may collect user interaction information through different communication channels at different times, or at the same time.

User interaction information may include, without limitation, a number of visitors accessing a communication menu through a communication channel within a set period of time, offered menu options, selected menu options, a reason for contacting/accessing the communication channel, duration of interaction, resolution of issue, user account information, geographical information, user attributes, whether live assistance was required to resolve issue, and other information gathered during an interaction with one of the communication menus.

At S302, the central server may also receive or collect notification information from a source external to the central server. Notification information may include, without limitation, weather information, system status (e.g., cell tower down), service outages, flood warnings, system announcements, emergency announcements, time information, and the like. Notification information may be universally applied or provided based on select information, such as geography, a communication channel through which a communication menu is provided, socioeconomic information of consumer base, and the like.

At S303, the central server receives or collects a directive set by an organization or source external to the central server, such as a directive set by a corporation, an owner of a communication menu accessed by users, third party vendors, or the like. The set directive may include, without limitation, a sales promotion of a particular product or services, announcement of a new product or service, upselling of add-on products or service, and the like.

At S304, the central server weighs the collected information according to predetermined rules. For example, user interaction information, such as menu option selection, may be weighted according to frequency of their selection. If users access the communication channels and select "billing" menu option the most, the "billing" menu option may be more heavily weighted than less selected menu options. Also, user interaction information may be weighted according amount of traffic received by a respective communication channel.

Further, weight may be placed according to a source of the user interaction information. For example, if the predetermined rules direct more emphasis to be placed on smart phone business, user interaction information sourced through the smart phone communication channel may be weighted more heavily.

In addition, special weighting may also be applied to certain information. For example, notification information, which may include emergency announcements, may receive a special weighting. Information of directives set (e.g., sales promotion of a new product or service) by a source external to the central server or directive information may also receive a large weighting factor or special weighting.

At S305, a unified menu may be generated based on the weighted information. More specifically, the weighted information may be transformed or converted as a unified menu option in a unified menu. For example, notification information, directive information, and/or menu options having a weight at or above a reference threshold or having special weight may be provided as a unified menu option or a notification on the unified menu. Collected information having a weight below the reference threshold may be included in a unified catch-all menu option, such as an "other" unified menu option.

The notification information and/or directive information may be provided as one of the unified menu options, or provided separately as a notification or an announcement. Such notification or announcement may be provided along with, before, or after providing of the unified menu.

Reference threshold may, for example, be a certain percentage of total menu option selection frequency (e.g., 20%) or a certain number of times that a menu option is selected within a set time period (e.g., 500 times in a 24 hour period). However, aspects of the disclosure are not limited to these thresholds, such that menu options receiving a special designation may also be provided as a unified menu option.

Further, the unified menu options may be modified in view of special weighting that may be applied to the collected information, such as user account information. For example, if it is determined that user account information of a user or consumer is in a delinquent status, menu options related to reactivation of account or billing may receive special weighting, such that those menu options may appear on the unified menu even if those menu options may not otherwise be able to reach the reference threshold. Further, in another example, only those menu options receiving special weighting may be available for selection within the unified menu, such that the user of the delinquent account may only reactivate or deal with billing issues.

At S307, the generated unified menu options may be ordered according to weighting information. For example, if the notification information was determined to be most heavily weighted or received a special weighting, the notification information may be displayed or audibly played first before other menu options. Similarly, if the directive information was determined to be second most heavily weighted or received a second special weighting, the directive information may be displayed or audibly played after the notification information. Remaining menu options may be ordered according to their weighting information.

Figure 4:
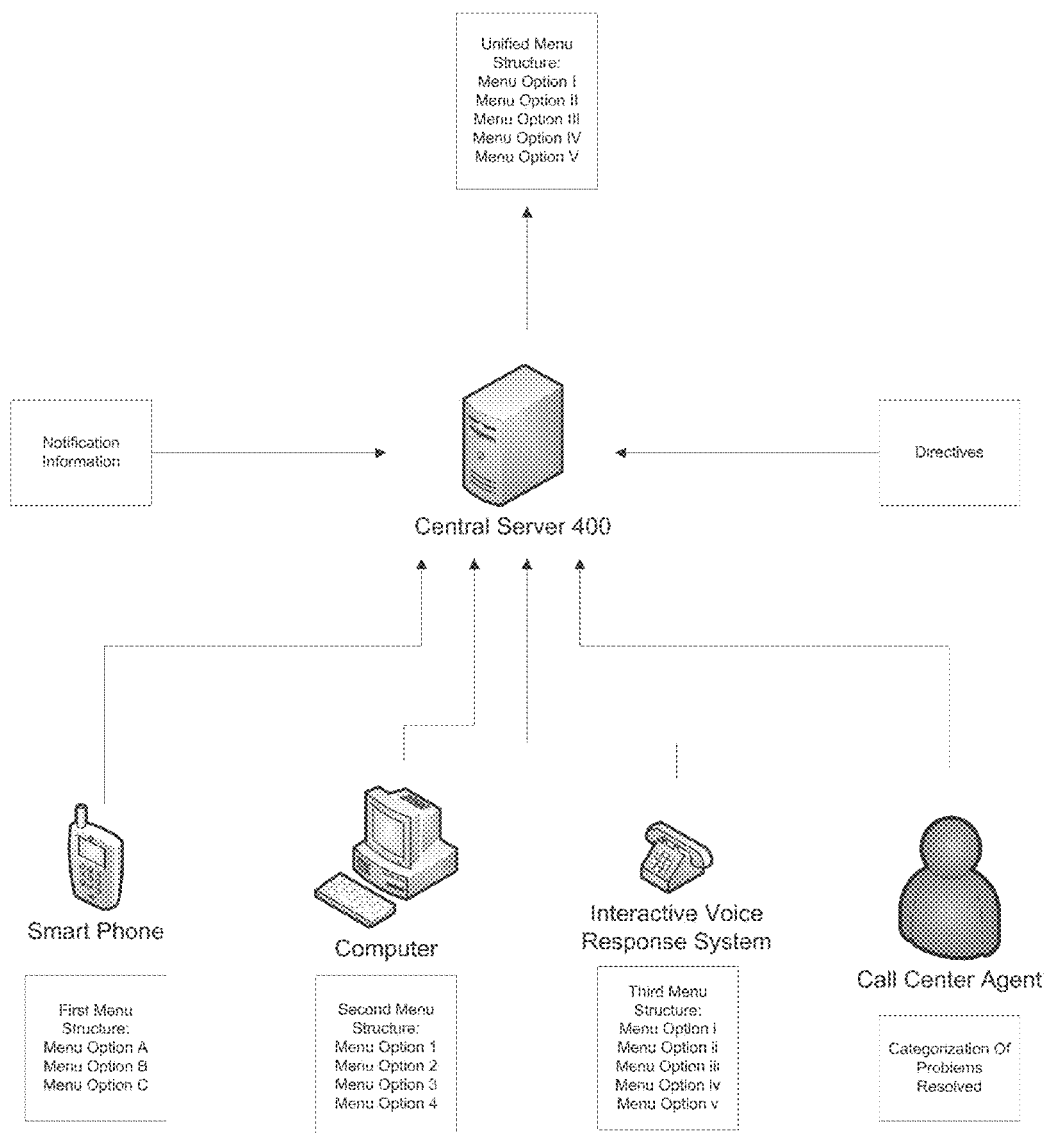
FIG. 4 shows an exemplary system to facilitate generation of a unified menu for multiple communication channels, according to an aspect of the present disclosure.

FIG. 4 shows an exemplary system to facilitate generation of a unified menu for multiple communication channels, according to an aspect of the present disclosure. Referring to FIG. 4, central server 400 may receive user interaction information through various communication channels (i.e., a smart phone, a computer, an interactive voice response system, and a call center agent) through which various communication menus having different menu options are provided. For example, the central server 400 may receive a number of times "Menu Option A", "Menu Option B", and "Menu Option C" were selected on a first menu structure provided through the smart phone communication channel as user interaction information. Similarly, the central server 400 may receive a number of times "Menu Option i", "Menu Option ii", "Menu Option iii", "Menu Option iv", and "Menu Option v" were selected on a third menu structure provided through the interactive voice response system communication channel.

The central server 400 may also receive categorization of problems resolved by call center agents. For example, categories of the problem resolved by the call center agents may include, without limitation, billing issues, cancellation issues, or technical issues. The central server 400 may also receive notification information and directive information, which may be considered in generating a unified menu.

In consideration of some or all of the collected information, a unified menu having a unified "Menu Option I", "Menu Option II", "Menu Option III", "Menu Option IV", and "Menu Option V" is generated.

Figure 5:
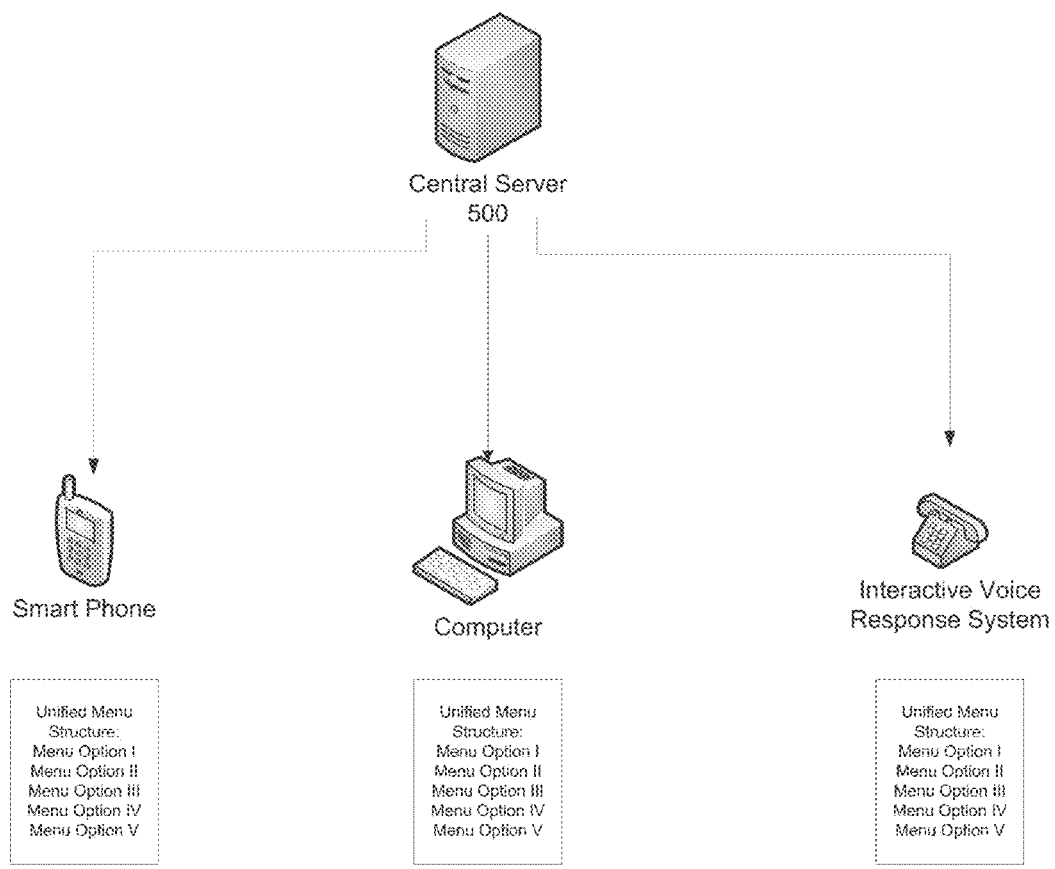
FIG. 5 shows an exemplary system to facilitate issuance of a unified menu for multiple communication channels, according to an aspect of the present disclosure.

FIG. 5 shows an exemplary system to facilitate issuance of a unified menu for multiple communication channels, according to an aspect of the present disclosure.

Once the unified menu is generated, as illustrated in FIG. 4, the unified menu is issued or applied across multiple communication channels. Referring to FIG. 5, the generated unified menu is applied to devices of various platforms through or via the smart phone communication channel, the computer communication channel, and the interactive voice response system communication channel. Accordingly, the three communication channels having the unified menu applied may provide similar and consistent user experience, regardless of the communication channel accessed by a user.

The unified menu may undergo a conversion process at the central server 500 before being applied to the multiple communication channels. For example, the smart phone communication channel may have different data format requirements than the interactive voice response system communication channel. The conversion process may also be performed by the individual communication channel or an end recipient.

Although the unified menu is described as being uniformly distributed across multiple communication channels, certain level of customization may be possible. Customization may be performed according to a geographical region, a time zone, sociological information, and the like. For example, if notification information, such as flood warnings, is relevant only to a select geographical region, for example, Virginia, only users or consumers accessing a communication channel from Virginia may receive the notification information with the unified menu. Similarly, directives, such as sales promotion, may be modified according to socioeconomic information corresponding to a geographic location. For example, sales promotion of a more expensive line of products may be provided to consumers residing in Manhattan, N.Y., whereas more economical line of products may be provided to consumers residing in Blackwater, Ariz.

Further, levels of customization may be possible at a macro level (e.g., geographic regions) or at an individual level. For example, if user account information of a consumer is received when the consumer accesses a communication channel, a menu item (e.g., individualized sales directive) or a special announcement specific to the consumer (e.g., user account status) may be provided along with the unified menu.

Figure 6:
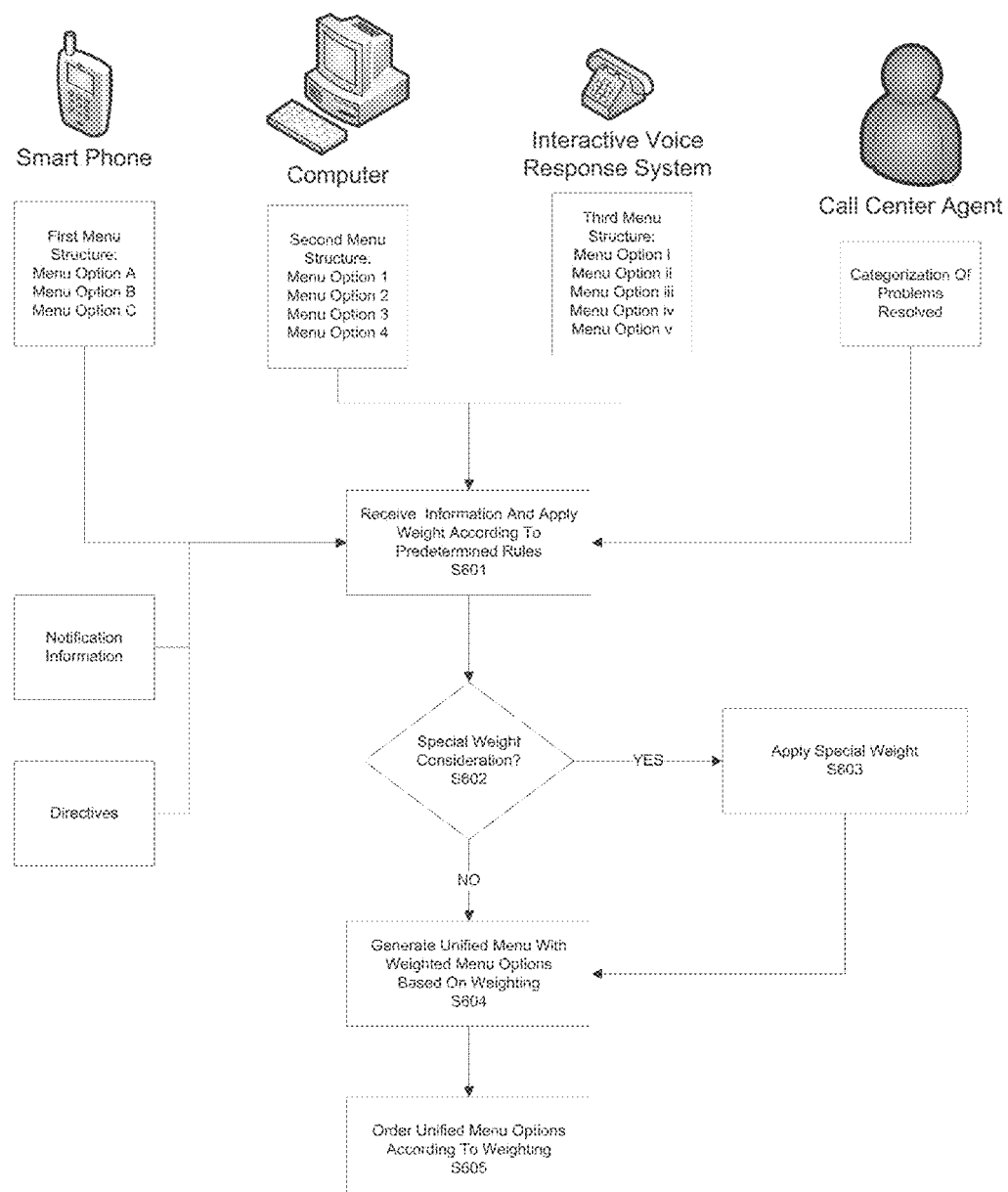
FIG. 6 shows an exemplary method for generating a unified menu across multiple communication channels with respect to a weighting scheme, according to an aspect of the present disclosure.

FIG. 6 shows an exemplary method for generating a unified menu across multiple communication channels with respect to a weighting scheme, according to an aspect of the present disclosure.

At S601, information is received through multiple communication channels, and a weight is applied to the received information according to predetermined rules. Referring to FIG. 6, user interaction information through or via a smart phone communication channel, a computer communication channel, and an interactive voice response system may be received. Further, categorization of problems resolved may be received via a call center agent communication channel. Notification information and/or directive information may also be received.

The predetermined rules may apply weight to the received user interaction information based on objective information. More specifically, weight may be applied according to origination or communication channel through which the user interaction information is received. For example, if there is more focus on developing business on a smart phone platform, more weight (e.g., double weight) may be applied to information received via the smart phone communication channel.

Weight may also be applied based on a number of users accessing a particular communication channel. For example, if a total number of users accessing all four channels is 400, and a number of users accessing the smart phone communication channel is 200, a 50% weight may be applied to the user interaction information collected through the smart phone communication channel.

Further, weight may be applied in view of a frequency of a menu option selection. For example, if a billing menu option is most frequently selected among all of the menu options available at a single communication menu or across multiple communication menus, more weight may be applied to the billing menu option.

Although several examples outlining how weight may be applied to the collected information, aspects of the disclosure are not limited to these examples, such that other weighting scheme may be applied.

At S602, a determination of whether special weight consideration has to be applied to the received information is made. For example, if an owner of various communication menus accessed by users wants to focus on categories of problems resolved by call center agents, special weight may be applied to user interaction information received through the respective communication channel. Also, special weighting may be applied to any notification information, directive information, and or user account status information, such that information receiving special weighting may be displayed with or before a unified menu, or audibly played before unified menu options.

If it is determined that the special weight consideration is to be applied to the received information, the method proceeds to S603. If no special weight consideration is to be applied to the received information, then the method proceeds to S604.

At S603, special weight is applied to select set among the received information. Special weight to be applied may be preset by a party external to the central server. Further, different levels of special weight may be applied. For example, for notification information, such as emergency announcements, a primary special weight may be applied, such that the emergency announcements may be provided first or most prominently among other announcements and unified menu options. Secondary special weight may be applied to directives, which may be provided after the emergency announcements.

At S604, a unified menu is generated with unified menu options based on weighted information. For example, the user interaction information (e.g., a menu option selected at a communication menu provided through an individual communication channel) having a weight above a reference threshold may appear as a unified menu option in the unified menu. User interaction information having a weight below the reference threshold may collectively be categorized under a unified default catch-all (e.g., "other") menu option.

At S605, the identified unified menu options may be ordered according to their weights. For example, unified menu options having special weight may be provided before the unified menu or receive priority in listing over the other unified menu options (e.g., appear top of the unified menu option listing). More specifically, notification information, such as emergency notification (e.g., flood warning), may be provided along with or before the unified menu.

Figure 7:
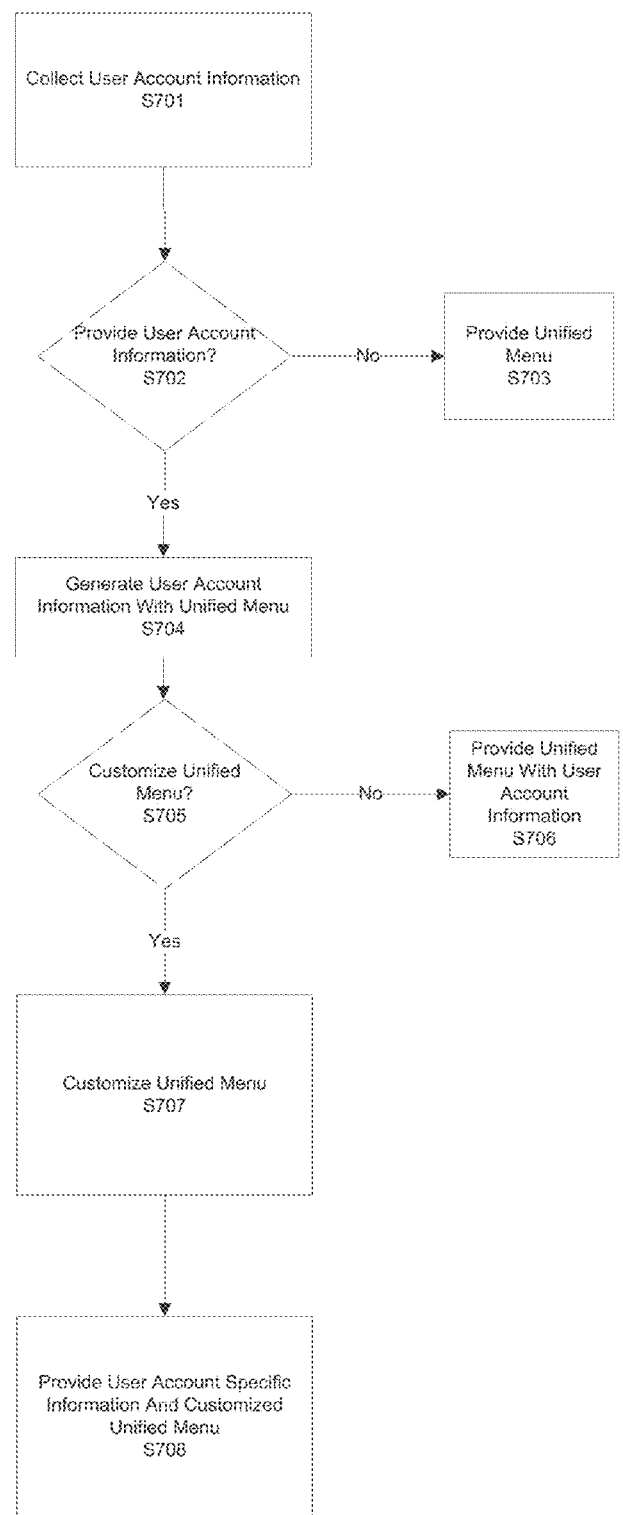
FIG. 7 shows an exemplary method for generating a unified menu across multiple communication channels with respect to user account specific information, according to an aspect of the present disclosure.

FIG. 7 shows an exemplary method for generating a unified menu across multiple communication channels with respect to user account specific information, according to an aspect of the present disclosure.

At S701, user account information of users or consumers accessing one or more of the multiple communication channels having a unified menu is collected. In an example, user account information may be collected separately or may be extracted from the collected user interaction information. User account information may include, without limitation, a user name, account status, outstanding balance, age, sex, occupation, address information, and the like. Further, user account may also include a history of user interaction information, such as options selected on a menu screen, issues researched, frequency of transactions, purchase history, and the like.

At S702, a determination is made to whether or not the collected user account information is to be provided along with the unified menu. If the user account information is determined not to be provided with the unified menu, the unified menu may be provided normally at S703. For example, if the user account is in an active status and no outstanding balance is due, it may be determined not to provide the user account information.

If the user account information is determined to be provided with the unified menu, user account information may be provided before, after, or along with the provided unified menu at S704. For example, if the user account is in a delinquent status due to nonpayment, the retrieved user account information may be provided along with the providing of the unified menu.

At S705, a determination is made to whether or not the unified menu is to be customized according to the user account information. If it is determined that the unified menu does not have to be customized, the unified menu may be provided along with the user account information at S706. For example, if the user account information specifies that a consumer is only few days late on payment, the user account information may be provided along with the unified menu.

If it is determined that the unified menu has to be customized in view of the user account information, the unified menu may be customized to add a new menu option or existing menu options may be reordered at S707. For example, if the user account is in a delinquent (e.g., missed several payments) or canceled status, a reactivation menu option may be reordered to be provided as a top menu option or created as a new unified menu option if it is not already available as one of the unified menu options.

At S708, a customized version of the unified menu with the user account information is applied or provided across the multiple communication channels. The customized version of the unified menu may provide different execution sequences that may be triggered than a regular unified menu.

For example, a technical support menu option from the regular unified menu may normally trigger providing of additional sub-menu options for user selection, such as type of device (e.g., televisions, computers, mobile devices, kitchen appliances) the user may be inquiring about.

In contrast, the customized version of the unified menu may trigger different execution sequences in view of user account information, such as a history of user interaction information. For example, the history of user interaction information may indicate that a user of the user account researched product A on day 1 on a computer, researched product A again on day 3 on a smart phone, and researched product A again on day 5 on a tablet computer. In view of this information, if the user decides to make a call on day 6 through an interactive voice response system and selects a technical support option from the customized version of the unified menu, a sub-menu that normally require the user to select a type of device may be bypassed, and the user may be directed to other menu options corresponding to product A. Alternatively, the customized version of the unified menu may connect the user directly to an agent specializing in product A once the technical support option is selected.

In another example, if the history of user interaction information indicates that the user attempted to resolve billing issues multiple times through a website, an interactive voice response system, and/or other communication channels, the user may be connected to a billing agent without having to make a menu option selection when the user calls a support center.

Figure 8:
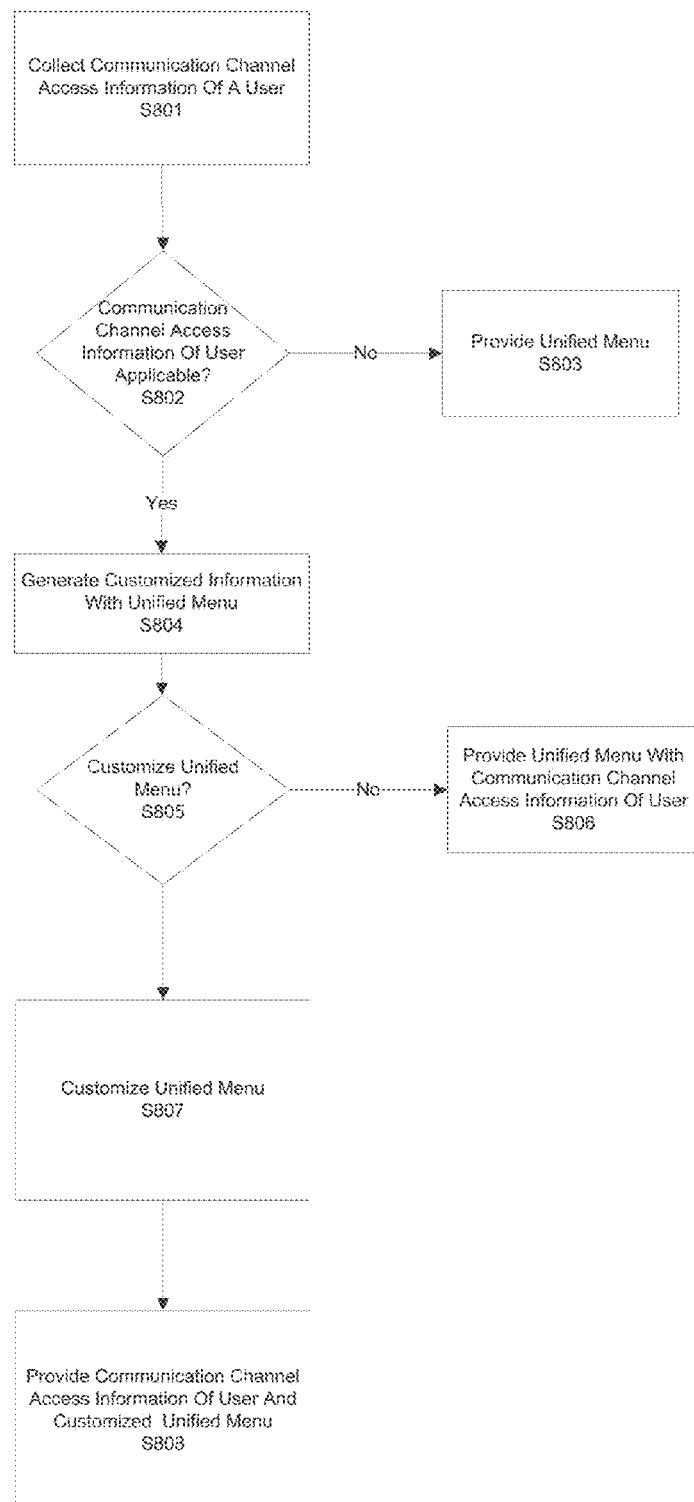
FIG. 8 shows an exemplary method for generating a unified menu across multiple communication channels with respect to communication channel access information of a user, according to an aspect of the present disclosure.

FIG. 8 shows an exemplary method for generating a unified menu across multiple communication channels with respect to communication channel access information of a user, according to an aspect of the present disclosure.

At S801, communication channel access information of consumers or users accessing one or more of the multiple communication channels having a unified menu is collected. For example, communication channel access information of the consumers may be separately collected or may be extracted from the collected user interaction information. Communication channel access information of a user may include, without limitation, a geographical location of the consumer accessing the communication channel, a device information through which the communication channel is accessed (e.g., brand, model, etc.), sex, and other information that may be collected through background information. The communication channel access information may be information that may be collected about a consumer that is not user account specific. For example, general information of a consumer that has yet to have created an account may be collected. However, aspects of the present disclosure are not limited to these examples, such that communication channel access information may include information similar to those in the user account information (e.g., name, address, age, birthday, etc.).

At S802, a determination is made to whether or not the collected communication channel access information is applicable to the unified menu. For example, if notification information relates to a flood warning for residents residing in Richmond, Va. and the consumer is accessing a communication channel having the unified menu from Richmond, Va., the flood warning message may be provided along with the unified menu. However, if a consumer accessing the communication channel is accessing the communication channel from Raleigh, N.C., the flood warning message may not be provided.

If the communication channel access information is determined not to be applicable to the unified menu, the unified menu may be provided normally at S803. If the communication channel access information is determined to be applicable to the unified menu, additional information (e.g., consumer directive information, notification information) corresponding to the communication channel access information may be provided before, after, along with, or separately from the provided unified menu at S804. For purposes of the present disclosure, the additional information will be described as being provided with the unified menu, where applicable.

At S805, a determination is made to whether or not the unified menu is to be customized according to the collected communication channel access information. For example, if it is determined that the consumer accessing the communication channel having a unified menu is from a geographical area where flood warning is in effect, technical support menu option may be moved to the top of the list of unified menu options or an emergency evacuation information menu option may be created.

If it is determined that the unified menu does not have to be customized, the unified menu may be provided along with the communication channel access information (e.g., flood warning message) at S806. If it is determined that the unified menu has to be customized in view of the communication channel access information, the unified menu may be customized to add a new menu option or existing menu options may be reordered at S807.

At S808, communication channel access information and the customized unified menu are provided across multiple communication channels.

Figure 9:
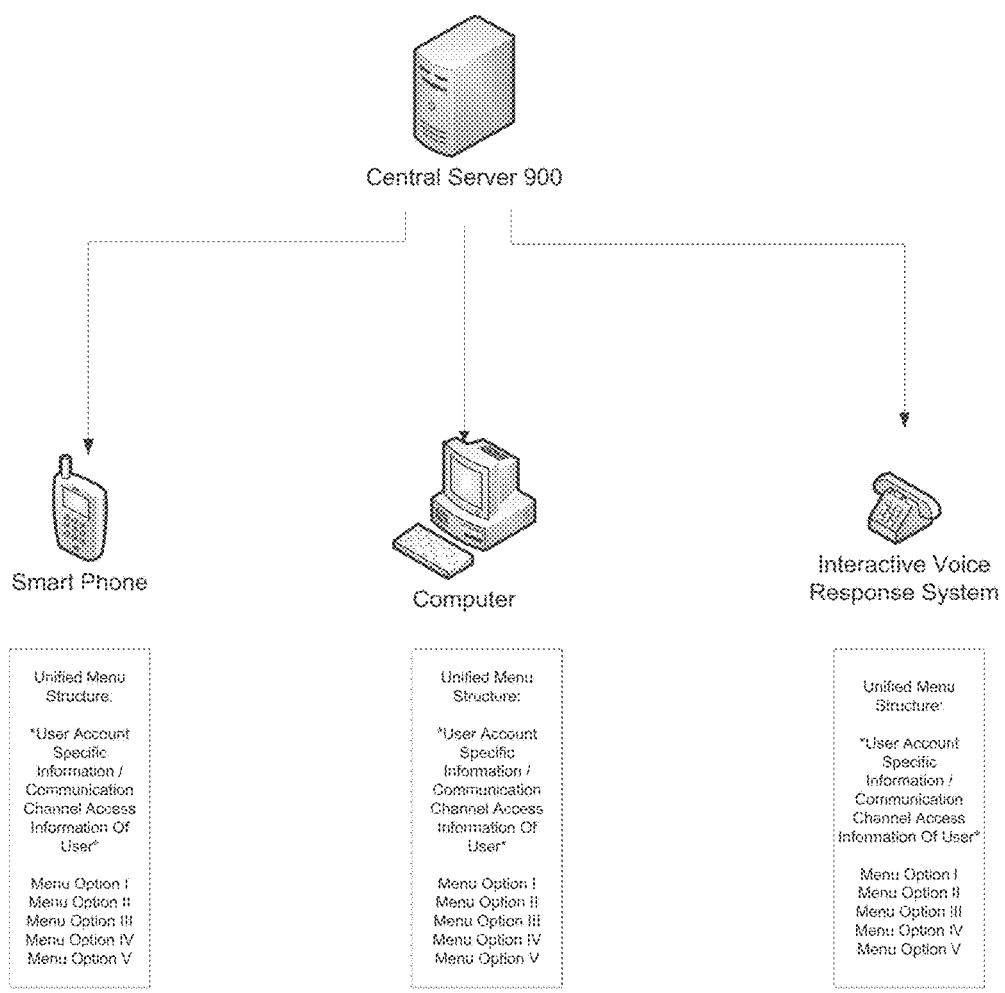
FIG. 9 shows an exemplary system for issuing a unified menu with user account specific information or communication channel access information of a user across multiple communication channels, according to an aspect of the present disclosure.

FIG. 9 shows an exemplary system for issuing a unified menu with user account specific information across multiple communication channels, according to an aspect of the present disclosure.

Once the unified menu is generated, the unified menu is issued or applied across multiple communication channels. Referring to FIG. 9, the generated unified menu is issued through the smart phone communication channel, the computer communication channel, and the interactive voice response system communication channel. Further, with the unified menu, user account specific information or communication channel access information may be provided. Accordingly, the unified menu provided through the three communication channels having received the unified menu may provide similar and consistent user experience, regardless of the communication channel accessed by a user. Although only three communication channels are illustrated herein, aspects of the present disclosure are not limited these communication channels, such that the unified menu may be provided through additional communication channels. Further, a customized unified menu may be provided instead of the unified menu based on the user account information or communication channel access information.

According to an aspect of the present disclosure, a method of providing a unified menu across a plurality of communication channels includes collecting first user interaction information via a first communication channel via which a first menu is provided, collecting second user interaction information via a second communication channel via which a second menu is provided, generating, using a processor at a centralized server, a unified menu comprising a list of unified menu options for selection based on the collected first user interaction information and second user interaction information, and transmitting, over a network, change requests to each of the first communication channel and the second communication channel to replace the first menu and the second menu with the unified menu to be presented to users.

According to an aspect of the present disclosure, the unified menu is generated further based on a directive set by a source external to the centralized server.

According to an aspect of the present disclosure, the unified menu is generated further based on notification information received from a source external to the centralized server.

According to an aspect of the present disclosure, the unified menu is generated in real-time.

According to an aspect of the present disclosure, the first user interaction information is weighted based on a number of users accessing the first menu.

According to another aspect of the present disclosure, the first user interaction information is weighted based on whether it is collected through the first communication channel.

According to yet another aspect of the present disclosure, the first user interaction information is weighted based on a frequency of a menu option selection from the first menu.

According to yet another aspect of the present disclosure, the method further includes, determining whether special weight is to be applied to the first user interaction information, and applying the special weight to the first user interaction information.

According to yet another aspect of the present disclosure, the special weight is determined to be applied based on a type of the first user interaction information.

According to yet another aspect of the present disclosure, the unified menu options are listed in a specific order based on weighting of the collected first user interaction information and second user interaction information.

According to yet another aspect of the present disclosure, the first user interaction information comprises a frequency of a menu option selection at the first menu.

According to yet another aspect of the present disclosure, the first user interaction information comprises a categorization of a problem of a user resolved by a call center agent.

According to yet another aspect of the present disclosure, the method further includes, obtaining user information of a target consumer accessing the first communication channel, and transmitting the user information to each of the first communication channel and the second communication channel for presentation along with the unified menu.

According to an aspect of the present disclosure, the method further includes, obtaining user information of a target consumer accessing the first communication channel, modifying the unified menu options based on the user information, and transmitting change requests to each of the first communication channel and the second communication channel to replace the unified menus with the modified unified menu to be presented to the target consumer when the target consumer accesses at least one of the first communication channel and the second communication channel.

According to an aspect of the present disclosure, the unified menu is presented to another consumer that is not the target consumer when the other consumer accesses at least one of the first communication channel and the second communication channel.

According to an aspect of the present disclosure, the modifying the unified menu options includes adding a new unified menu option.

According to an aspect of the present disclosure, the modifying the unified menu options includes reordering of the unified menu options.

According to an aspect of the present disclosure, the user information includes user account information.

According to an aspect of the present disclosure, a tangible non-transient computer readable storage medium that stores a computer program, the computer program, when executed by a processor, causing a computer apparatus to perform a process including collecting first user interaction information via a first communication channel via which a first menu is provided; collecting second user interaction information via a second communication channel via which a second menu is provided; generating, using a processor of the computer apparatus, a unified menu comprising a list of unified menu options for selection based on the collected first user interaction information and second user interaction information; and transmitting, over a network, change requests to each of the first communication channel and the second communication channel to replace the first menu and the second menu with the unified menu to be presented to users.

According to an aspect of the present disclosure, a computer apparatus includes a memory that stores instructions, and a processor that executes the instructions. When executed by the processor, the instructions cause the processor to perform the following operations: collecting first user interaction information via a first communication channel via which a first menu is provided; collecting second user interaction information via a second communication channel via which a second menu is provided; generating, using the processor, a unified menu comprising a list of unified menu options for selection based on the collected first user interaction information and second user interaction information; and transmitting, over a network, change requests to each of the first communication channel and the second communication channel to replace the first menu and the second menu with the unified menu to be presented to users.

Accordingly, a system and method for generating a unified menu for multiple communication channels enables generation of a unified menu for issuance across multiple communication channels to provide a uniform experience. By providing the unified menu across multiple platforms accessed through by various communication channels, users can expect to receive the same or similar experience regardless of platform or communication channel accessed by the user. Further, by collecting user interaction information across various platforms and communication channels, menu options that are more relevant to the users' interests may be provided. Further, by providing a single access point for an organization, which may be accessed through multiple communication channels, the organization may be able to transmit important notifications and sales promotions without having to make changes individually for each communication channel. In addition, the uniform menu may be customized according to information of the users (e.g., geographical information, user attributes, user account information, etc.) accessing one of the communication channels via which the uniform menu is provided.

Although a system and method for generating a unified menu for multiple communication channels has been described with reference to several exemplary embodiments, it is understood that the words that have been used are words of description and illustration, rather than words of limitation. Changes may be made within the purview of the appended claims, as presently stated and as amended, without departing from the scope and spirit of the system and method for generating a unified menu for multiple communication channels has been described with reference to particular means, materials and embodiments, the system and method for generating a unified menu for multiple communication channels is not intended to be limited to the particulars disclosed; rather the system and method for generating a unified menu for multiple communication channels extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, the communication channels and unified menus described herein represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a unified menu across a plurality of communication channels, the method comprising:
    collecting, by a processor over a network, first user interaction information via a first communication channel via which a first menu is provided, the first user interaction information including an identity of a menu option and a frequency of selection of the menu option on the first communication channel, the first communication channel being a first channel type;
    collecting, by the processor over the network, second user interaction information via a second communication channel via which a second menu is provided, the second user interaction information including an identity of a menu option and a frequency of selection of the menu option on the second communication channel, the second communication channel being a second channel type different than the first channel type;
    applying, by the processor, weights to the selections of the menu options included in the first user interaction information and the second user interaction information based on frequencies of selections of the menu options on the first communication channel and the second communication channel;
    determining whether each of the applied weights is above a reference threshold;
    generating, using the processor, a unified menu comprising a list of unified menu options that are ordered in a sequential order based on the applied weights that are above the reference threshold, wherein a menu option selected having an applied weight less than the reference threshold is omitted from the unified menu;
    transmitting, over the network, change requests to each of the first communication channel and the second communication channel to replace the first menu and the second menu with the unified menu to be presented to users;
    applying the unified menu to each of the first communication channel and the second communication channel, such that same menu options are provided for both of the first communication channel and the second communication channel;
    determining whether special weight is to be applied to the selection of the menu option included in the first user interaction information; and
    applying the special weight to the selection of the menu option included in the first user interaction information when the special weight is determined to be applied,
    wherein the selection of the menu option included in the first user interaction information is weighted based on a number of users accessing the first menu, and
    wherein the selection of the menu option included in the first user interaction information is weighted based on whether user interaction information is collected through the first communication channel.

2. The method according to claim 1, wherein the unified menu is generated further based on a directive set by a source external to a centralized server.

3. The method according to claim 1, wherein the unified menu is generated further based on notification information received from a source external to a centralized server.

4. The method according to claim 1, wherein the unified menu is generated in real-time.

5. The method according to claim 1, wherein the special weight is determined to be applied based on a type of the first user interaction information.

6. The method according to claim 1, wherein the first user interaction information comprises a categorization of a problem of a user resolved by a call center agent.

7. The method according to claim 1, further comprising:
    obtaining user information of a target consumer accessing the first communication channel; and
    transmitting the user information to each of the first communication channel and the second communication channel for presentation along with the unified menu.

8. The method according to claim 1, further comprising:
    obtaining user information of a target consumer accessing the first communication channel;
    modifying the unified menu options based on the user information; and
    transmitting change requests to each of the first communication channel and the second communication channel to replace the unified menus with the modified unified menu to be presented to the target consumer when the target consumer accesses at least one of the first communication channel and the second communication channel.

9. The method according to claim 8, wherein the unified menu is presented to another consumer that is not the target consumer when the other consumer accesses at least one of the first communication channel and the second communication channel.

10. The method according to claim 8, wherein the modifying the unified menu options includes adding a new unified menu option.

11. The method according to claim 8, wherein the modifying the unified menu options includes reordering of the unified menu options.

12. The method according to claim 8, wherein the user information includes user account information.

13. A tangible non-transient computer readable storage medium that stores a computer program, the computer program, when executed by a processor, causing a computer apparatus to perform a process comprising:
    collecting, over a network, first user interaction information via a first communication channel via which a first menu is provided, the first user interaction information including an identity of a menu option and a frequency of selection of the menu option on the first communication channel, the first communication channel being a first channel type;
    collecting, over the network, second user interaction information via a second communication channel via which a second menu is provided, the second user interaction information including an identity of a menu option and a frequency of selection of the menu option on the second communication channel, the second communication channel being a second channel type different than the first channel type;

applying weights to the selections of the menu options included in the first user interaction information and the second user interaction information based on frequencies of selections of the menu options on the first communication channel and the second communication channel;

determining whether each of the applied weights is above a reference threshold;

generating a unified menu comprising a list of unified menu options that are ordered in a sequential order based on the applied weights that are above the reference threshold, wherein a menu option selected having an applied weight less than the reference threshold is omitted from the unified menu;

transmitting, over the network, change requests to each of the first communication channel and the second communication channel to replace the first menu and the second menu with the unified menu to be presented to users;

applying the unified menu to each of the first communication channel and the second communication channel, such that same menu options are provided for both of the first communication channel and the second communication channel;

determining whether special weight is to be applied to the selection of the menu option included in the first user interaction information; and applying the special weight to the selection of the menu option included in the first user interaction information when the special weight is determined to be applied, wherein the selection of the menu option included in the first user interaction information is weighted based on a number of users accessing the first menu, and wherein the selection of the menu option included in the first user interaction information is weighted based on whether user interaction information is collected through the first communication channel.

14. A computer apparatus, comprising:
a memory that stores instructions, and
a processor that executes the instructions,
wherein, when executed by the processor, the instructions cause the processor to perform operations comprising:
collecting, over a network, first user interaction information via a first communication channel via which a first menu is provided, the first user interaction information including an identity of a menu option and a frequency of selection of the menu option on the first communication channel, the first communication channel being a first channel type;

collecting, over the network, second user interaction information via a second communication channel via which a second menu is provided, the second user interaction information including an identity of a menu option and a frequency of selection of the menu option on the second communication channel, the second communication channel being a second channel type different than the first channel type;

applying weights to the selections of the menu options included in the first user interaction information and the second user interaction information based on frequencies of selections of the menu options on the first communication channel and the second communication channel;

determining whether each of the applied weights is above a reference threshold;

generating a unified menu comprising a list of unified menu options that are ordered in a sequential order based on the applied weights that are above the reference threshold, wherein a menu option selected having an applied weight less than the reference threshold is omitted from the unified menu;

transmitting, over the network, change requests to each of the first communication channel and the second communication channel to replace the first menu and the second menu with the unified menu to be presented to users;

applying the unified menu to each of the first communication channel and the second communication channel, such that same menu options are provided for both of the first communication channel and the second communication channel;

determining whether special weight is to be applied to the selection of the menu option included in the first user interaction information; and applying the special weight to the selection of the menu option included in the first user interaction information when the special weight is determined to be applied, wherein the selection of the menu option included in the first user interaction information is weighted based on a number of users accessing the first menu, and wherein the selection of the menu option included in the first user interaction information is weighted based on whether user interaction information is collected through the first communication channel.

15. The method according to claim 1, wherein the first channel type is one of a mobile telephone communication channel, a computer communication channel, a landline communication channel, and wherein the second channel type is other of the mobile telephone communication channel, the computer communication channel, the landline communication channel.

* * * * *